United States Patent [19]
Hibi et al.

[11] 3,840,307
[45] Oct. 8, 1974

[54] SINGLE PICKUP TUBE COLOR CAMERA

[75] Inventors: Masao Hibi, Kodaira; Yoshizumi Eto, Hachioji, both of Japan

[73] Assignee: Hitachi, Ltd., Tokyo, Japan

[22] Filed: Nov. 7, 1972

[21] Appl. No.: 304,356

[30] Foreign Application Priority Data

Nov. 10, 1971 Japan ............................. 46-89018

[52] U.S. Cl. ............................................. 358/46
[51] Int. Cl. ........................................... H04n 9/06
[58] Field of Search ........... 178/5.4 ST; 358/44, 45, 358/46

[56] References Cited

UNITED STATES PATENTS 3,730,977 5/1973 Larsen ......................... 178/5.4 ST

*Primary Examiner*—Robert L. Richardson
*Attorney, Agent, or Firm*—Craig & Antonelli

[57] ABSTRACT

A single pickup tube color camera including as its characteristic parts a semiconductor substrate serving as a video signal electrode, a color filter consisting of three kinds of stripe filter units and disposed on one principal surface of the substrate, PN junctions formed in the other principal surface of the substrate and serving as photoelectric transducer elements, an insulating layer disposed in the vicinity of the PN junctions, a reference signal electrode consisting of conducting stripes disposed on the insulating layer, and means for taking electrical signals from the video signal electrode and the reference signal electrode.

9 Claims, 12 Drawing Figures

SINGLE PICKUP TUBE COLOR CAMERA

BACKGROUND OF THE INVENTION

1. Field of the Invention

This invention relates to a single pickup tube color camera, and more particularly to a color camera with which red, green and blue components of an image of an object can be obtained, and from which a video signal and a reference signal separated from each other can be derived.

2. Description of the Prior Art

In order to obtain a color television signal, signals corresponding to the components in three primitive colors of an image of an object are needed. The most widely used camera for color television system is a three-pickup-tube color camera which converts the identical images in three primitive colors of an object into corresponding three television signals by means of three pickup tubes. Indeed, the three pickup tube color camera has an advantage that it can produce a picture of high quality, but it also suffers from drawbacks that it is expensive, large in size and hard to maintain. And a single pickup tube color camera with which the above mentioned shortcomings can be eliminated, is suitable for industrial or family use.

For example, a conventional single pickup tube color camera uses a composite color filter consisting of red, green and blue filter units in the shape of adjacent stripes to form the image of an object. However, such a single pickup tube color camera has to be supplied with a bias light having a constant intensity so as to produce a stable black level signal. Moreover, since the video signal produced by the prior art color camera provides a low-resolution image, there is the drawback which will be explained below.

SUMMARY OF THE INVENTION

One object of this invention is to provide a single pickup tube color camera which can produce a signal representative of the reference phase without the supply of a bias light.

Another object of this invention is to provide a single pickup tube color camera which can produce television signals of high resolution.

Therefore, the single pickup tube color camera according to this invention, which has been invented to attain the above object, includes a video signal electrode from which the television signals corresponding to the images in red, green and blue lights of an object are obtained and a reference signal electrode from which the reference signal is derived. Moreover, in this color camera according to the invention, the video signal electrode and the reference signal electrode are disposed respectively before and after the photoelectric transducing section of the pickup tube with respect to the object, that is, the video signal electrode is exposed to the light from the object which the reference signal electrode is exposed to a scanning electron beam, so that only signals corresponding to the images of an object may be obtained from the video signal electrode and that only the reference signal having a constant level may be derived from the reference signal electrode. Furthermore, according to the invention, the stripe filter units of the color filter disposed nearer to the object than the video signal electrode as well as the reference signal electrode have a structural periodicity and the ratio of the period of the latter to that of the former is an integral number.

DESCRIPTION OF THE PREFERRED EMBODIMENTS

Some embodiments of the invention will be described in comparison with a conventional color camera, through reference to the attached drawings.

Figure 1:
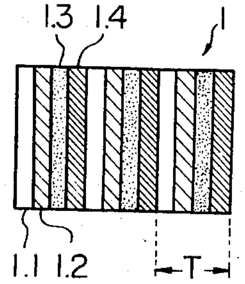
FIG. 1 PRIOR ART
FIG. 1 is a front view of a stripe color filter used in a conventional color camera.

Referring to FIG. 1, there is illustrated a stripe color filter 1 used in a single pickup tube color camera of the well known type, through which the image of an object is picked up. The color filter 1 comprises a plurality of stripes 11, 12, 13 and 14; i.e. red, green, blue and black filter units arranged periodically in this order. If these stripes are arranged perpendicular to the direction of horizontal scan in the image pickup tube, then signals corresponding to the images of the object in red, green and blue light, respectively and a signal independent of the object and representative of a constant black level can be repeatedly delivered from the video signal electrode of the tube. By detecting the black level signal from among those delivered from the video signal electrode and sampling the red, green and blue signals in an appropriate timing relation to the black level signal can be separated red, green and blue television signal from one another. This stripe filter, however, has the following drawbacks.

1. In order to stably detect the black level signal even in case the image of the object is dark, it is necessary to cause the pickup tube to receive a bias light having a constant intensity level independent of the image of the object.

2. It is necessary for the pickup tube to have a resolution of T/4 (T is the width of one period of the stripe filter, i.e. total width of the red, green, blue and black filter units), while the resolution of the obtained red, green and blue television signals is T. Namely, the resolution of the television signals is a quarter of that achieved by the pickup tube.

Figure 2:
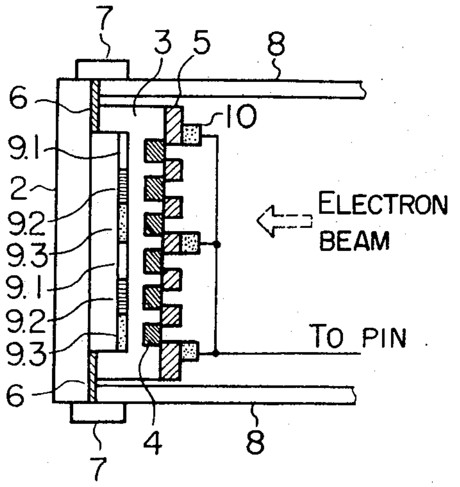
FIG. 2 is a cross section of the principal part, somewhat exaggerated for clarity's sake, of a color camera according to this invention.

FIG. 2 shows in cross section the principal portion of a single pickup tube color camera embodying the invention, which includes a well-known silicon target vidicon using an array of photodiodes as its photoelectric transducing section. In FIG. 2, a glass face plate 2 covers an N-type silicon substrate 3. P-type regions 4 of boron diffused layer are formed in matrix configuration in one main surface of the substrate 3 and an insulating layer 5 of $SiO_2$ is formed on the substrate surface where the matrix of the P-type regions are formed, except those areas which are occupied by the P-type regions. The silicon substrate 3 is electrically connected via a conductor 6 with a target ring 7. An envelope 8 together with the face plate 2 and the target ring 7 defines a vacuum-tight compartment. The PN junctions consisting of the N-type substrate 3 and the P-type regions 4 formed thereon serve as a photoelectric transducer and the charging current which flows when the junction capacitances are charged by means of an electron beam, is in proportion to the intensity of the incident light through the glass face plate 2. And the charging current is taken out of the target ring 7 to be used as a video signal. Here, the silicon substrate 3, which has conductivity to some extent, serves also as the video signal electrode mentioned previously. In a vidicon in current use, a resistive layer to eliminate surface charges on the insulating layer 5 and an additional $N^+$ layer to increase sensitivity to short-wavelength lights may be provided respectively on the insulating layer 5 and the N-type silicon substrate 3. Color filter consisting of filter units 9.1, 9.2 and 9.3 in the shape of stripe is formed in the other main surface of the silicon substrate 3 serving as the video signal electrode. The positions of the stripe-shaped color filter units 9.1, 9.2 and 9.3 are aligned to those of the P-type regions 4 on the opposite surface. In this embodiment shown in FIG. 2, the correspondence between stripe and column of P-type regions is in the ratio of 1 : 1. It is, of course, possible to provide several columns of the P-type regions corresponding to a single filter stripe. Then, each column or each group of columns of the PN junctions produces a signal corresponding to the red, green or blue component of the incident light. A reference signal electrode 10 of a conductive layer is formed on the insulating layer 5. In the reference signal electrode 10, the same structure repeats itself in the horizontal direction, i.e. along the lines of horizontal scanning, and therefore there is a structural periodicity in the electrode 10. From this point of view, it can be stated that there are structural periodicities also in the stripe color filter, the P-type regions 4 and the insulating layer 5. For example, one period of the stripe color filter 1 consists of the filter units 1.1, 1.2, 1.3 and 1.4. In this embodiment, the period of the reference signal electrode 10 and that of the insulating layer 5 are in an integral ratio, i.e. ratio of 3 : 1, which is the same as the ratio of the period of the stripe color filters to that of the reference signal electrode 10. The same structural segments of the electrode 10 are connected with one another and commonly with a pin (not shown).

Figure 3:
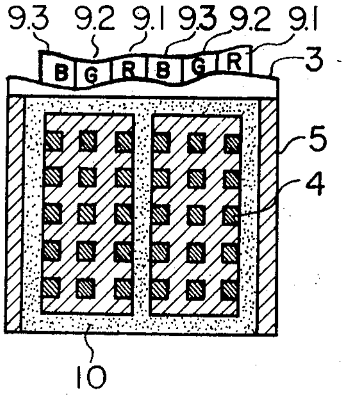
FIG. 3 is a front view of the principal part shown in FIG. 2, on an enlarged scale.

FIG. 3 illustrates the structure shown in FIG. 2 as viewed from the direction in which the electron beam scans the target, and the same reference numerals are applied to the same parts as in FIG. 2.

Figure 4:
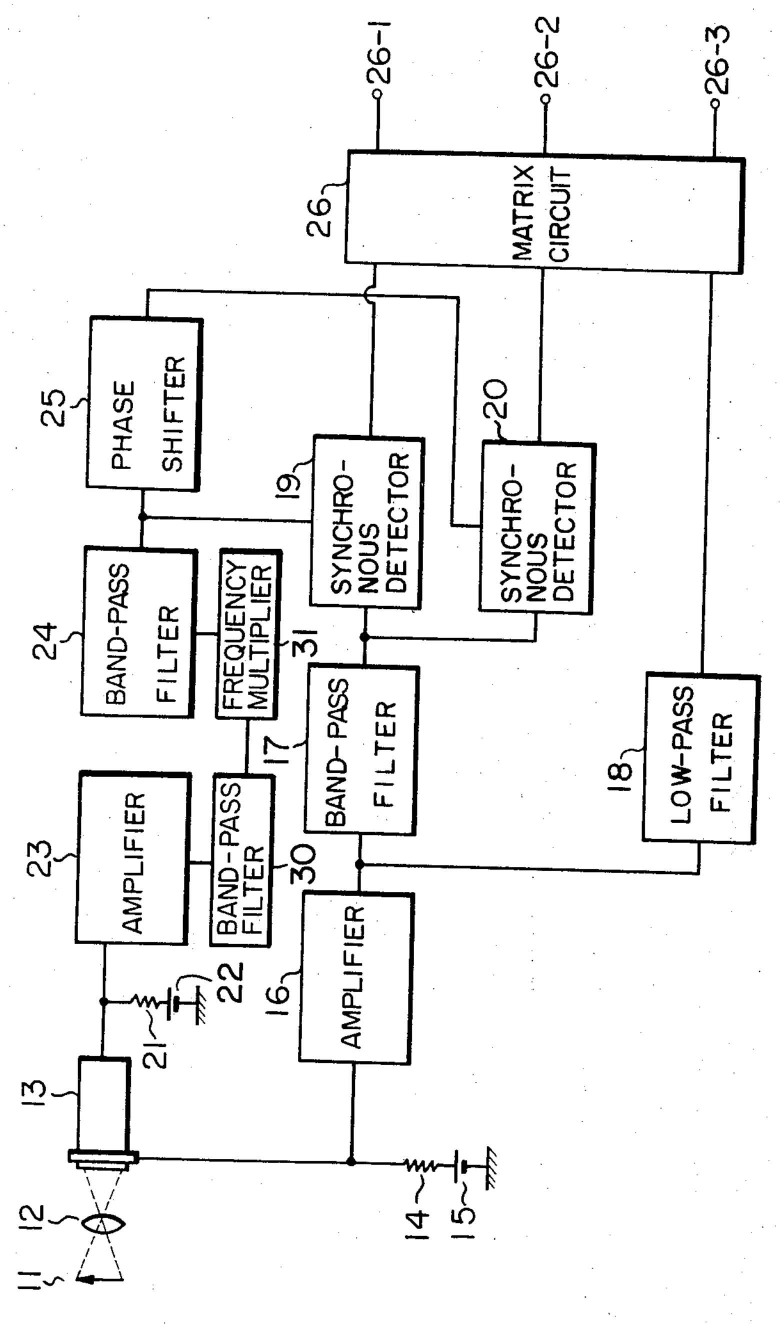
FIG. 4 shows a block diagram of a circuit for processing the signals from the color camera of this invention.

FIG. 4 shows a block diagram of a circuit for processing the signals delivered from the single pickup tube color camera of this invention. In FIG. 4, the image of an object 11 is focussed on a single pickup tube color camera 13 having the same structure as in FIG. 2 by means of a lens 12. The series circuit of a power source 15 and a resistor 14 is connected between ground and the target ring 7 (not shown in FIG. 4) coupled to the video signal electrode. The series circuit of a power source 22 and a load resistor 21 is connected between ground and the pin (not shown in FIG. 4) coupled to the reference signal electrode. Numerals 16 and 23 are amplifiers; 17 a band-pass filter; 18 a low-pass filter; 19 and 20 synchronous detectors; 24 a bandpass filter; 25 a phase shifter; 26 a matrix circuit, and numerals 26-1, 26-2 and 26-3 indicate output terminals of the matrix circuit 26. Numerals 30 and 31 designate a band-pass filter and frequency multiplier, respectively. With this circuit, the video signal and the reference signal can be developed respectively across the load resistors 14 and 21, if the electron beam scanning in the color camera 13 is initiated. The video signal $S(t)$, in which the component signals R, G, B corresponding to the red, green and blue components of the image of an object appear in periodical sequence, can be expressed by the following formula $$S(t)=\frac{1}{3}\{R+G+B\}+\frac{2}{3}\sum_{n=1}^{\infty}\frac{\sin\frac{1}{3}n\pi}{\frac{1}{3}n\pi}\left\{R\cos\omega_o t+G\cos\left(\omega_o t-\frac{2}{3}\pi\right)+B\cos\left(\omega_o t-\frac{4}{3}\pi\right)\right\} \quad (1)$$

Figure 5A:
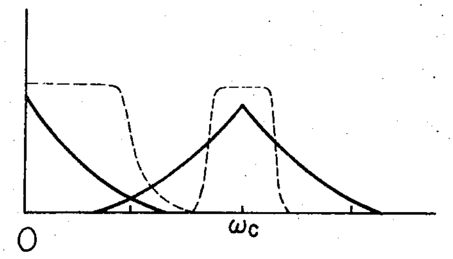
FIGS. 5*a* and 5*b* show the frequency spectra of the signals delivered from the color camera of this invention.

In the above formula, the quantity $\omega_c$ is defined by the relation $$\omega_c = 2\pi/T_c \quad (2)$$

where $T_c$ is the time during which the scanning electron beam traverses the whole width T of one period of the color filter. In practice, the diameter of the scanning electron beam in a pickup tube cannot be made as small as we please so that there is a limit to the frequencies of the reproduced signals. Hence, only the case where n in the formula (1) is 1, i.e. $n = 1$, should be considered. In such a case, the frequency spectrum of the video signal $S(t)$ is given by the curves in solid line in FIG. 5*a;* in which the influence by the first term {R + G + B} prevails at lower frequencies while near the frequency $\omega_c$ the second term $\{R\cos\omega_c t + G\cos(\omega_c t - ⅔\pi) + B\cos(\omega_c t - 4/3\pi)\}$ makes its effect conspicuous. If the video signal $S(t)$ is, therefore, divided into two channels through the band-pass filter 17 having the center frequency of $\omega_c$ and the low-pass filter 18 having the cut-off frequency of $\omega_c/2$ (the frequency characteristics of these filters are shown in broken line in FIG. 5*a*), after being amplified through the amplifier 16, then the outputs $S_H(t)$ and $S_L(t)$ of the respective channels are such that $$S_H(t) = \sqrt{3}\{R\cos\omega_c t + G\cos(\omega_c t - ⅔\pi) + B\cos(\omega_c t - 4/3\pi)\} \quad (3)$$

and $$S_L(t) = ⅓(R + G + B) \quad (4)$$

Figure 5B:
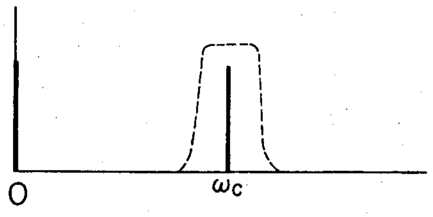

On the other hand, the reference signal $P(t)$ is a pulse having a constant amplitude at frequency $\omega_c$ and the frequency spectrum of $P(t)$ is a single vertical bar at frequency $\omega_c$, as indicated in FIG. 5*b*, which is decomposed into a DC component and a component depending on the frequency $\omega_c$ alone. Then, if the reference signal $P(t)$ is passed directly to through the band-pass filter 24 having the center frequency of $\omega_c$, after being amplified by the amplifier 23, then an output $P'(t)$ is obtained such that $$P'(t) = \cos \omega_c t \tag{5}$$

If the output $P'(t)$ is shifted by phase shifter 25 in phase by $\pi/2$, a signal $P''(t)$ is obtained such that $$P''(t) = \sin \omega_c t \tag{6}$$

When the signal $S_H(t)$ is detected by the synchronous detectors 19 and 20 with the aid of the signals $P'(t)$ and $P''(t)$, the detected outputs $D_1$ and $D_2$ of the detectors 19 and 20 are such that $$D_1 = R - \tfrac{1}{2}(G + B) \tag{7}$$

and $$D_2 = G - B \tag{8}$$

with constant coefficients to the signals R, G and B omitted.

The calculation by the matrix circuit 26, using $S_L$, $D_1$ and $D_2$, yield the results for R, G and B, respectively at the terminals 26-1, 26-2 and 26-3, such that $$R = S_L + \tfrac{2}{3}D_1 \tag{9}$$

$$G = S_L - \tfrac{1}{3}D_1 + \tfrac{1}{2}D_2 \tag{10}$$

and $$B = S_L - \tfrac{1}{3}D_1 - \tfrac{1}{2}D_2 \tag{11}$$

As has been described above, there is no need for the supply of bias light for the color camera according to this invention which light is needed to generate the reference signal with a conventional color camera, and moreover the resolution will be much improved. Namely, if the period T of the color filter, the horizontal scanning width of the used pickup tube, the horizontal scanning period of television, and the effective horizontal scanning rate are respectively $60\mu$, 12 mm, $63.5\mu$ sec., and 80 percent, then it follows that $$\omega_c/2\pi \approx 4 \text{ MH}_z$$

Moreover, the pass-band width of the band-pass filter 17 will be $4 \pm 0.5$ $MH_z$ since a band width of 0.5 $MH_z$ is sufficient for the chrominance signal. Accordingly, the resolution required for the image pickup tube used in the system in question of 4.5 $MH_z$, as is understood from the curve in broken line in FIG. 5*a*, while the resolution of the obtained color signal is determined depending upon the band width of the low-pass filter 18, that is, equal to $\tfrac{1}{2} \times \omega_c/2 = 2$ $MH_z$. Therefore, the resolution of the obtained color signal is 1/2.25 times the resolution of the pickup tube, that is, far less than ¼ of the resolution achieved with a conventional system. This is a remarkable advantage over the prior art system.

In the foregoing description, the case is mentioned where the period T of the color filter (9.1 – 9.3) is equal to that of the reference signal electrode 10. In general, however, the ratio of the one to the other has only to be n : m, where m and n are both positive integers. In this case, the frequency of the reference signal is $n/m$ $\omega_c$ and the output of the amplifier 23 as shown in FIG. 4 must be passed through a band-pass filter 30 having the center frequency of $n/m$ $\omega_c$, frequency-multiplied by a factor of $m/n$ by means of a multiplier 31 and then fed to the band-pass filter 24.

The above description is devoted exclusively to the color camera, as shown in FIG. 2, employing a silicon target vidicon. The merit of using a silicon target vidicon is due to the fact that the control of the arrangements of the color filter and the reference signal electrode is facilitated since the PN junctions of the silicon target vidicon are periodically disposed. In addition, according to this invention, an ordinary vidicon having antimony trisulfide as photoconductive layer can also be effectively utilized.

Figure 6:
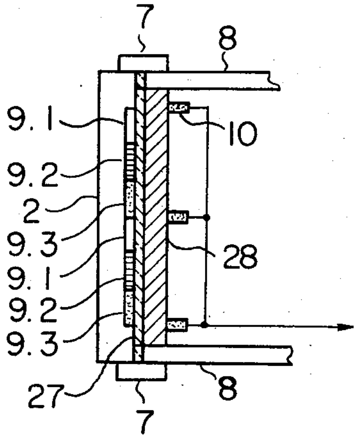
FIG. 6 is a cross section of the principal part of a color camera as another embodiment of this invention.

FIG. 6 shows as a second embodiment of this invention a single pickup tube color camera using such an ordinary vidicon, especially its principal portion in cross section. In this figure, the same reference numerals are applied to like parts or elements as in FIG. 2. Only a difference is the provision of a transparent video signal electrode 27 disposed on the color filter consisting of filter units 9.1, 9.2 and 9.3, and a photoconductive layer 28 provided on the transparent electrode 27, on which layer the reference signal electrode 10 is laid out.

The stripe filter units 9.1, 9.2 and 9.3 of the color filters used in the embodiments shown in FIGS. 2 and 6 are of the filtering media that are respectively permeable to red, green and blue lights. However, they may be made of filtering materials that reflect red, green and blue lights, respectively, i.e. cyan, magenta and yellow filters. In this latter case, $S_L(t)$ of the formula (4) is somewhat changed such that $$S_L(t) = \tfrac{2}{3}(R + G + B) \tag{12}$$

Hence, it follows that for R, G and B in this case, the $S_L$'s in the formulae (9), (10) and (11) have to be multiplied by a factor of ½.

Further, in the color cameras of the embodiments shown in FIGS. 2 and 6, the video signal electrode 3 is connected with the target ring 7 while the reference signal electrode 10 is coupled to the pin. However, each of these electrodes 3 and 10 may be connected with one half of the target ring that is divided into two equal parts.

Figure 7:
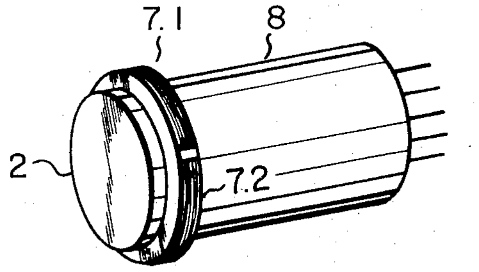
FIG. 7 is a perspective view of a color camera according to this invention.

FIG. 7 shows in a perspective view a color camera as a third embodiment of this invention, which has a target ring consisting of two identical parts 7.1 and 7.2. In this figure, numerals 2 and 8 indicate a glass face plate and an envelope for defining a vacuum-tight compartment, respectively.

Figure 8:
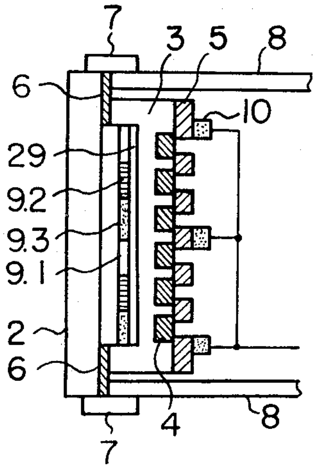
FIGS. 8 to 11 show the principal part, some in cross section and other in front view, of color cameras as further embodiments of this invention.
Figure 9:
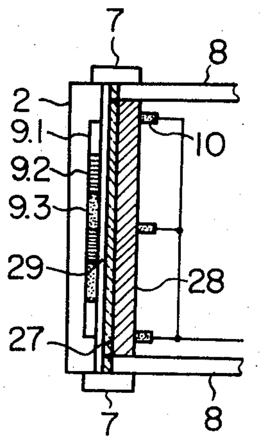
Figure 10:
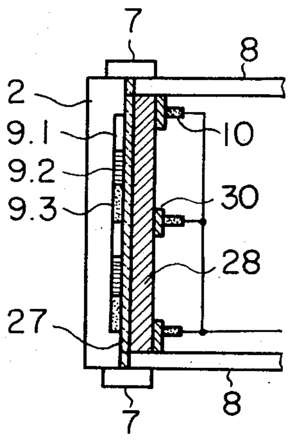

The color filter (9.1 – 9.3) and the N-type silicon substrate 3 are in close contact with each other in the embodiment shown in FIG. 2 while the color filter (9.1 – 9.3) and the video signal electrode 27 are closely contacted with each other in the embodiment shown in FIG. 6. A thin transparent glass plate 29 may, however, be interposed between the contacting members, as seen in FIGS. 8 and 9. Moreover, the photoconductive layer 28 and the reference signal electrode 10 in the embodiment in FIG. 6 are contiguous with each other, but a thin insulating layer 30 may be inserted between them, as shown in FIG. 10. In any case, the overall fabrication of the color camera can be made easier if such an intermediate member is incorporated.

Furthermore, in the embodiments shown in FIGS. 2 and 6, the reference signal electrode 10 is in the shape of a ladder, having stripes parallel to the stripe filter units of the color filter. However, a lattice-shaped reference signal electrode can also be employed which besides the stripes parallel to the stripe filter units, has stripes perpendicular to the filter units. Such a lattice-shaped electrode is easier of fabrication than a ladder-like electrode.

Figure 11:
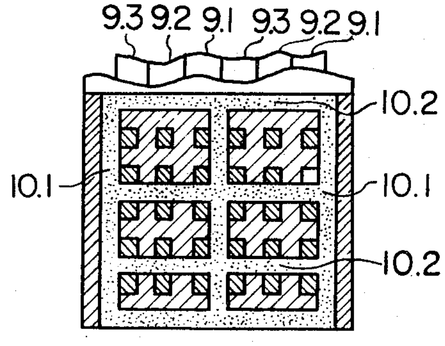

FIG. 11 shows the principal part of a color camera embodying the invention, which employs a lattice-shaped reference signal electrode in which vertical stripes 10.1 and horizontal stripes 10.2 form a lattice. The same reference numerals are applied to like parts as in FIG. 3.

The advantages of the present invention described above may be summed up as follows.

1. Since the video signal and the reference signal are separately obtained, no separation circuit for them is needed and the resolution of obtained color pictures is very high.

2. No bias light for obtaining the referance signal is needed.

In addition to these, this invention can also enjoy the general merits that a single pickup tube color camera of phase division type in which three chrominance signals have the same period, is possessed of. They are as follows.

3. The simultaneous signals representative of three primitive colors can be easily obtained.

4. Since the non-uniformity of the pickup tube and the non-linearity of output current in response to the incident light give rise to no hue error, the color reproducibility is excellent.

5. There are no aberration of signals representative of three primitive colors from their proper relative positions, that is, non-registration is prevented.

Thus, this invention has contributed further more to the improvement in the single pickup tube color television camera which can obtain a picture of high quality with its simple structure as it is.

We claim:

1. In a single pickup tube color camera including electron beam generating and scanning means and a transparent face plate, the improvement comprising a color filter disposed on said face plate and consisting of three different kinds of stripe filter units permeable to different color lights and so arranged as to have structural periodicity; a transparent video signal electrode disposed on said color filter; photoelectric transducing sections formed on said video signal electrode; a stripe reference-signal electrode disposed on said transducing sections, and having stripe portions extending parallel to said stripe filter units of said color filter and having a structural period equal to *m*/*n* (*m* and *n;* positive integers) of that of said stripe filter units; and first means for taking out signals from said video signal electrode and second means connected in common to all of the stripe portions of said reference-signal electrode for taking out a reference signal therefrom; wherein when the electron beam scans said photoelectric transducing sections in perpendicular relation to said stripe filter units, the video signal in which the components in said different colors of the image of an object are periodically contained, can be obtained from said video signal electrode while the reference signal having constant amplitude and a period equal to *m*/*n* of that of said video signal can be derived from said reference signal electrode.

2. A color camera as claimed in claim 1, wherein an insulating layer is interposed between said photoelectric transducing sections and said reference signal electrode.

3. A color camera as claimed in claim 1, wherein said first and second means for taking out signals consist of two equal parts of a split target ring, and said video signal and said reference signal are respectively taken out of said two parts.

4. A color camera as claimed in claim 1, wherein said reference signal electrode is further provided with stripe portions perpendicular to said stripe portions parallel to said stripe filter units so that said reference signal electrode may have the shape of a lattice.

5. A color camera as claimed in claim 1, wherein a transparent insulating plate is interposed between said color filter and said video signal electrode.

6. In a single pickup tube color camera, including a transparent face plate, comprising a color signal generating device, a set of color filters disposed on said face plate and consisting of three different kinds of stripe filters permeable to different color components arranged in a periodically repetitive manner, a transparent video signal electrode disposed on said color filters, photoelectric transducing sections formed on said video signal electrode, and a stripe reference signal electrode composed of a plurality of conductive stripes disposed on said transducing sections, the stripes of said reference signal electrode being parallel to the stripes of said color filters and the period of the stripes of said reference signal electrode being equal to *m*/*n* (*m* and *n:* positive integers) of the period of repetition of said stripe color filters; means for scanning said photoelectric transducing sections with an electron beam in a direction rectangularly traversing the stripes; and frequency converting means connected to said reference signal electrode for multiplying by *m*/*n* the frequency of the reference signal derived from said reference signal electrode; whereby the reference signal having a period equal to *m*/*n* of that of input video signal can be obtained.

7. A color camera as claimed in claim 6, wherein an insulating layer is interposed between said photoelectric transducing sections and said reference signal electrode.

8. A color camera as claimed in claim 6, wherein said reference signal electrode is further provided with stripe portions perpendicular to said stripe portions parallel to said stripe filter units so that said reference signal electrode may have the shape of a lattice.

9. A color camera as claimed in claim 6, wherein a transparent insulating plate is interposed between said color filter and said video signal electrode.

* * * * *